Patented Nov. 13, 1945

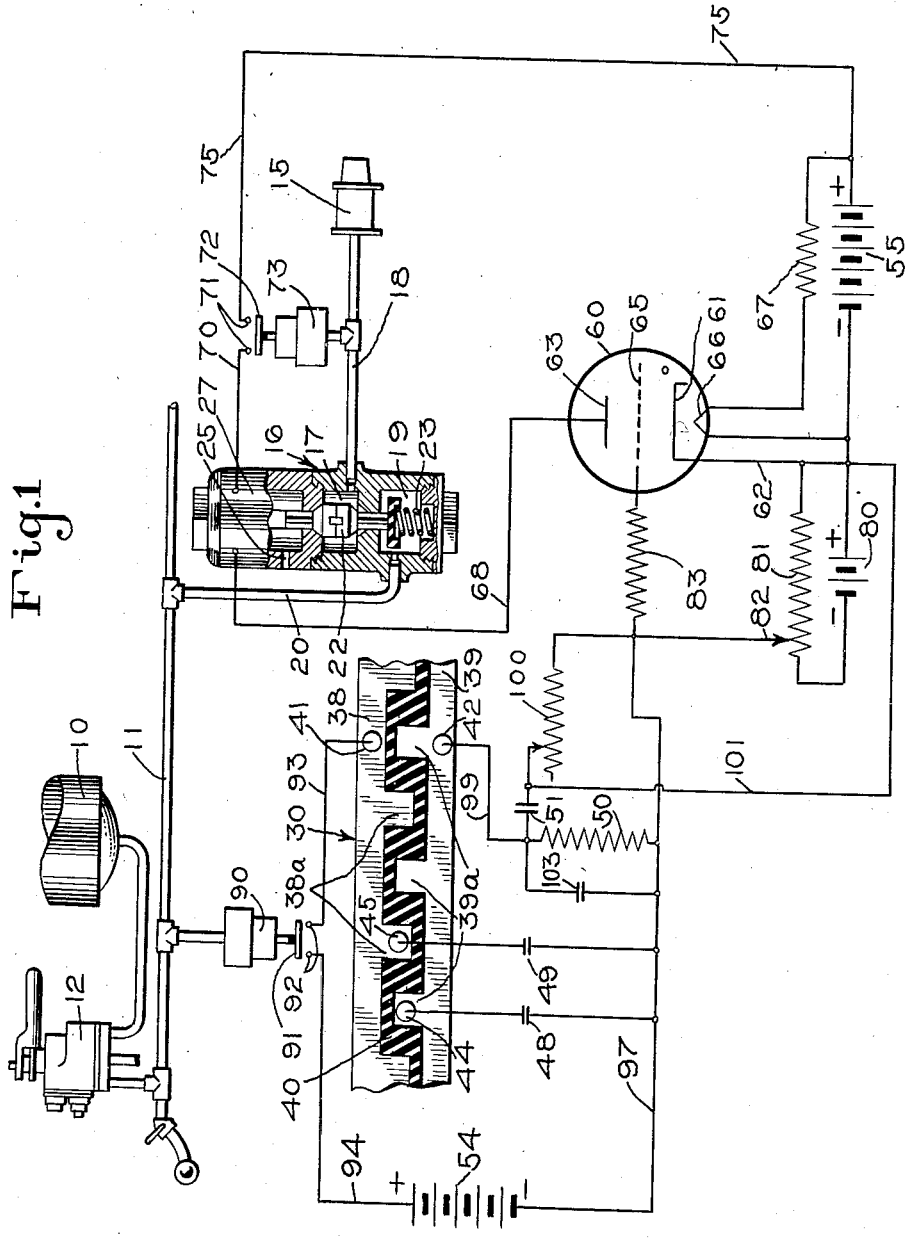

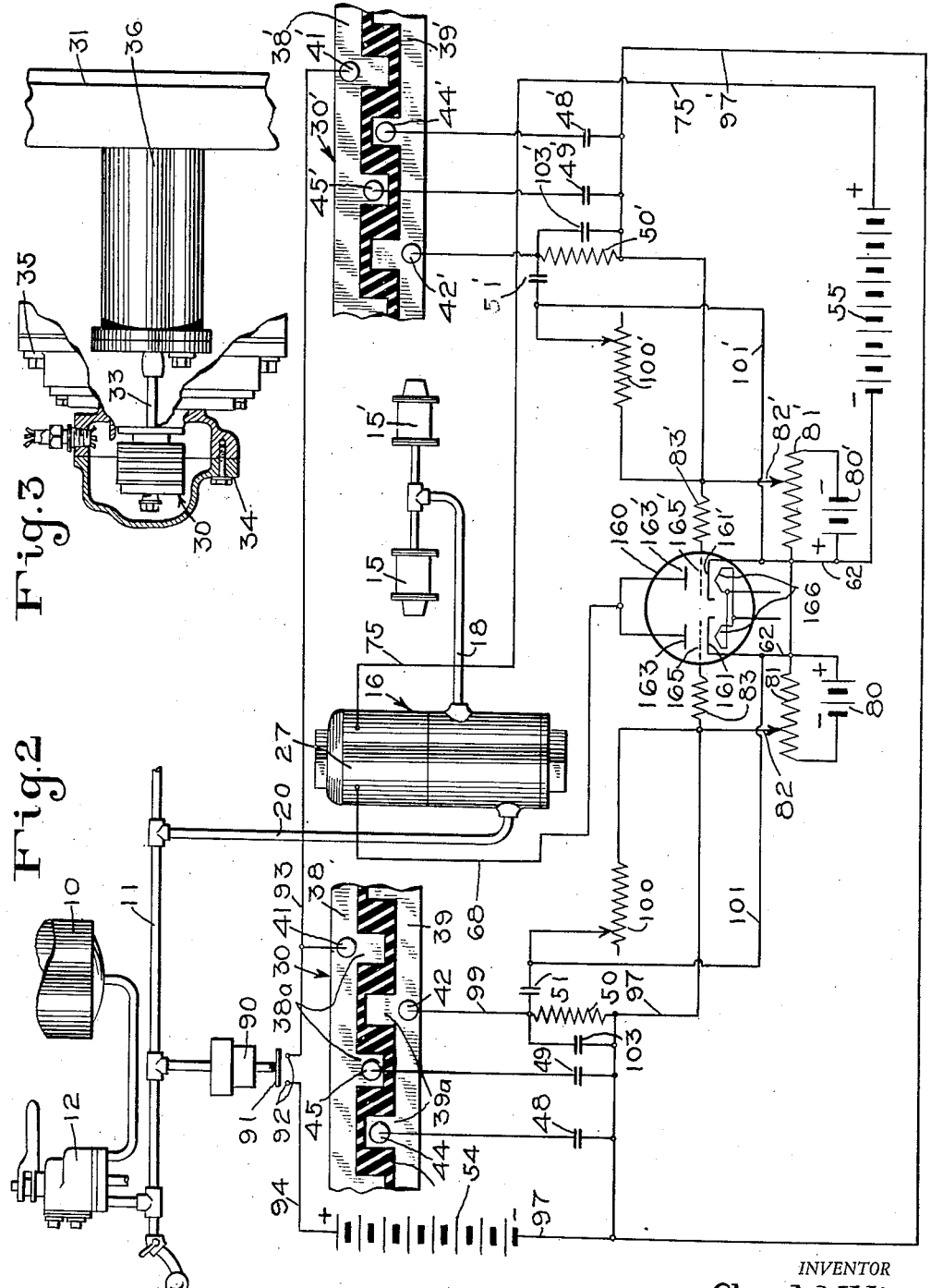

2,389,049

UNITED STATES PATENT OFFICE 2,389,049

ELECTRONIC BRAKE CONTROL APPARATUS

Claude M. Hines, Pittsburgh, Pa., assignor to The Westinghouse Air Brake Company, Wilmerding, Pa., a corporation of Pennsylvania Application March 4, 1944, Serial No. 525,025

18 Claims. (Cl. 303—21)

This invention relates to means for detecting and regulating changes in speed or deceleration and acceleration of a rotary element such as a vehicle wheel, and more particularly to electrical means responsive to the rate of change of speed of a vehicle wheel for controlling the application of the associated brakes in a manner preventing sliding of the wheel.

In the operation of the brake system of a railway vehicle it is desirable to prevent sliding of the wheels when an application of the brakes is effected. As is generally understood, a braked wheel may begin to slip on the rail when retarded with excessive force, after which the loss of adhesion between the wheel and rail is likely to cause further deceleration of the wheel at an abnormally rapid rate until it becomes locked and slides, resulting in damage to the wheel and extension of the time required to bring the vehicle to a stop. Various automatic devices have been proposed for detecting such slipping of a wheel in time to effect quick reduction in the degree of application of the brakes until the wheel can be brought back to a speed corresponding to the speed of the vehicle. Among the anti-wheel-slide control devices heretofore proposed have been a number of electro-responsive units comprising in each case an axle-driven generator or commutator mechanism arranged to establish an electrical potential which is a measure of the speed or rate of deceleration of a wheel of the vehicle, together with means for utilizing the varying potential for governing energization of suitable relays and valves operative to control the brakes. One example of such a brake control means is disclosed in United States Patent 2,270,414 to Canetta and Bossart, dated January 20, 1942, and assigned to the assignee of the present invention.

In the construction of such a control equipment in actual practice, it is necessary to provide a generator or other source of electrical energy having sufficient capacity to operate the required number of electro-responsive elements, including relatively expensive relay devices and the like. While certain of the anti-wheel-slip equipments already in use have afforded vast improvement in train braking performance resulting in reduction in expenses of operation and replacement service, it is apparent that even greater advantages might result if such an equipment could be devised for operation on less power, rendering feasible the use of less expensive elements more simply constructed and arranged. Practical consideration of the problems involved in construction and operation of this class of brake control apparatus has indicated that a significant advance in that field can best be obtained with an entirely new control system operating on a different principle than that of the earlier devices. This result I propose to provide by employing a novel arrangement combining means for establishing an electrical characteristic that is a measure of the rotative condition, such as speed or acceleration of a wheel or other member, control means for controlling rotation of that member, and electronic means constructed and arranged to respond to the electrical characteristic for governing the control means in a predetermined manner.

One object of my invention is thus to provide an improved control apparatus embodying electronic means operative to prevent sliding of vehicle wheels.

Another object of the invention is to provide an improved brake control apparatus the elements of which are constructed and arranged to insure precise control of the brakes over a wider range of speeds of the vehicle than has heretofore been practicable.

A still further object of the invention is to provide a brake control apparatus in which relatively inexpensive electronic means may be employed for establishing the accurate and prompt control of the brakes of a vehicle which is particularly desirable in the operation of modern high speed railway equipment.

Other objects and advantages of the invention will appear in the following more detailed description thereof, taken in connection with the accompanying drawings, in which Fig. 1 is a diagrammatic view showing a portion of a fluid pressure brake equipment having associated therewith an improved electronic control apparatus constructed in accordance with one form of the invention;

Fig. 2 is a diagrammatic view of a portion of an air brake system equipped with a control apparatus embodying a different form of the invention; and Fig. 3 is a fragmentary elevational view, partly in section, showing a wheel and journal assembly of a vehicle embodying a control unit of a type hereinafter described.

*Apparatus shown in Fig. 1*

Illustrated in Fig. 1 of the drawings is an elementary form of fluid pressure brake equipment comprising a source of supply of fluid under pressure including a reservoir 10, a straight air pipe 11, a self-lapping brake valve device 12 for controlling the supply of fluid under pressure to the straight air pipe in effecting an application of the brakes, a brake cylinder 15, and an electro-responsive control valve device 16 interposed between the straight air pipe 11 and the brake cylinder. The self-lapping brake valve device 12 may be of any suitable construction and is arranged to maintain the pressure of fluid supplied to the straight air pipe 11 at a value determined by the position of the usual handle. The brake cylinder 15 is operative to apply braking force to a wheel of the vehicle through the medium of suitable brake elements, now shown, in accordance with the pressure of fluid supplied to the straight air pipe 11, subject, however, to the operation of the electro-responsive valve device 16 for preventing sliding of the wheel, as hereinafter explained.

The electro-responsive valve device 16 comprises a casing structure having a valve chamber 17 communicating by way of a pipe 18 with the brake cylinder 15, and normally communicating through a spring chamber 19 and pipe 20 with the straight air pipe 11. Contained in the valve chamber 17 is a valve element 22 which is normally held in an upper seated position, as shown in the drawings, by a spring 23, for closing communication from the valve chamber 17 to an atmospheric exhaust port 25 formed in the casing structure. The valve element 22 is constructed and arranged to be moved downwardly upon energization of an electro-magnet 27, as hereinafter explained, and upon such movement to its lower seated position is adapted to cut off communication between the chamber 19 and the brake cylinder pipe 18, while connecting the latter to the atmospheric port 25.

Associated with the fluid pressure brake system is an apparatus operative by a wheel to which the braking force is to be applied for establishing an electrical characteristic that is a measure of the rate of change of speed of the wheel, in order to afford a basis for the desired control of the brakes preventing wheel sliding. The apparatus as here illustrated has the general features of construction of that disclosed in the copending application of Kelley and Hines filed in the United States Patent Office July 31, 1943, Serial No. 496,874, and assigned to the assignee of the present application, and comprises a commutator device indicated generally by the reference character 30 in Fig. 1. The commutator device 30 is also illustrated in Fig. 3 in a form found suitable in actual practice, the commutator device being shown operatively connected to the wheel 31 of the vehicle, to which wheel it will be understood the braking force exerted by the brake cylinder 15 is applied. As shown in Fig. 3, the commutator device 30 is fixed on a spindle 33 which is journaled within a suitable housing 34 carried by the vehicle journal box structure 35. The spindle 33 is coupled to the outer end of the axle 36 of the wheel 31, in order that the commutator device 30 can be driven with the wheel.

Referring again to Fig. 1, the commutator device 30 is shown in diagrammatic form as including a pair of coaxially associated collector rings or slip ring elements 38 and 39 spaced apart by suitable insulation material 40. The slip ring elements 38 and 39 are adapted to be engaged by stationary brushes 41 and 42, respectively. Each of the slip rings 38 and 39 is provided with a plurality of extensions or segments 38a and 39a, respectively, which are separated by non-conductive or insulating segments of the insulating material 40 and are aligned for intermittent cooperation with a pair of stationary brushes 44 and 45. These brushes 44 and 45 are so arranged as to span an insulating segment while engaging one or the other of the slip ring segments 39a and 38a, each brush being adapted to engage the slip ring segments in alternation as the commutator device is revolved with the wheel of the vehicle.

Associated with the commutator device 30 are two condensers 48 and 49, which are arranged to be alternately charged and discharged through the medium of the commutator device for delivering a discharge current determined by the speed of the vehicle wheel through a discharge circuit, which includes a resistor 50 connected in parallel relation with a condenser 51 of relatively large capacity compared to that of each of condensers 48 and 49. A full disclosure of the operation of the elements of the commutator apparatus may be found in the aforementioned patent application, from which it will be understood that the commutator device 30 is operative to transform a constant voltage, established by a suitable source of energy such as a battery 54, into a varying voltage proportional to commutator speed, by the process of effecting alternate charging and discharging of the two condensers 48 and 49, resulting in the flow of a pulsating direct current causing a voltage drop across the resistor 50 corresponding to the speed of the vehicle wheel. It will further be understood that with the condenser 51 connected in parallel relation with the resistor 50 the charging current for that condenser, and the amount of current discharged therefrom as well, are substantially proportional to the rate of increase and decrease, respectively, of the voltage drop across the discharge resistor 50, and consequently substantially proportional to the rate of acceleration and the rate of deceleration of the wheel of the vehicle.

According to my invention, electronic means is provided for cooperation with the commutator apparatus just described in order to detect and correct an undesirable wheel-slipping condition that may develop during an application of the brakes. As shown in Fig. 1 of the drawings, the equipment further includes an electron discharge device 60, which may be of the gas-filled type and has the general construction of a triode tube. The electron discharge device 60 has a cathode 61 which is connected through the medium of a conductor 62 to the negative terminal of a battery 55, an anode 63, and a control member or grid 65. A heating filament 66 is provided for the cathode 61, and may be energized by any suitable circuit. In Fig. 1 the heater filament 66 is shown as connected in series relation with a current limiting resistor 67 across a battery 55. The anode 63 of the electron discharge device is connected by a conductor 68 to one end of the coil of the electromagnet 27 in control valve device 16, the other end of the coil being connected to the positive terminal of the battery 55 through the medium of a conductor 70, a pair of stationary contact elements 71 and a movable contact element 72 of a pneumatic switch device 73, and a conductor 75.

Means are provided for normally maintaining the electron discharge device 60 in a nonconductive state, comprising a battery 80 constructed and arranged to impress on the control member 65 a negative voltage which is sufficient to render the device nonconductive, so long as an opposing positive voltage sufficient to overcome the biasing potential is not established by operation of the commutator apparatus in response to slipping of the wheel, as hereinafter explained. The battery 80 impresses a predetermined negative potential on the control member 65 through the medium of a potentiometer or voltage divider 81, the adjustable tap member 82 of which is connected through a current limiting resistance 83 to the control member.

The apparatus shown in Fig. 1 further includes a fluid pressure responsive switch device 90 adapted to be operated upon the supply of fluid under pressure to the control pipe 11 to move a switch contact element 91 into bridging relation with a pair of contact elements 92, one of which is connected by way of a conductor 93 with the brush 41, and the other of which is connected to a conductor 94 leading to the positive terminal of the battery 54. The negative terminal of the battery 54 is connected by way of a conductor 97 to the lower terminals of the respective condensers 48 and 49, and also to the lower terminal of resistance 50. The upper terminal of the resistance 50 is connected by a wire 99 to the brush 42. A condenser 103 may be connected across the resistor 50 to serve as a filter for smoothing out the pulsating voltage impressed on that resistor, as will be explained hereinafter.

Connected in series across the discharge resistor 50 are the condenser 51 and a variable resistor 100. One end of the resistor 100 is also connected through resistor 83 to the control member 65 of the electron discharge device 60, while the other end adjacent condenser 51 is connected to the cathode 61 by means of a conductor 101 and conductor 62.

Let it be assumed that the vehicle equipped with the apparatus shown in Fig. 1 is operated along the track with the brakes released, in which case the self-lapping brake valve device 12 is disposed in release position for isolating the reservoir 10 while connecting the control pipe 11 to the atmosphere by way of the usual exhaust passages (not shown). With the control pipe 11 thus connected to the atmosphere, the fluid pressure responsive switch device 90 is rendered inoperative so that the contact element 91 is maintained in circuit opening position for preventing the commutator device 30 from effecting the normal biasing potential on the control member of the electron discharge device 60, although it will be understood that the commutator device is being rotated along with the wheel 31 shown in Fig. 3. The control element 65 of the electron discharge device 60 is thus still subject to the normal negative biasing voltage impressed thereon by means of the battery 80 as hereinbefore explained, so that the device is maintained nonconductive. At the same time, the magnet valve device 16 remains in its deenergized position, as shown in Fig. 1, and is thus conditioned to connect the brake cylinder 15 to the vented control pipe 11.

When it is desired to effect an application of the brakes, the brake valve device 12 is operated to supply fluid under pressure from the reservoir 10 to the control pipe 11 and thence by way of the pipe 20, chamber 19 of the magnet valve device, past the valve element 22, and through chamber 17 and pipe 18 to the brake cylinder 15. Both switches 90 and 73 are at the same time actuated to their respective circuit closing positions. It will be understood that the self-lapping valve device 12 is operative to maintain the desired pressure of fluid in the control pipe 11 and brake cylinder 15, in accordance with the position of the handle.

Upon operation of the fluid pressure responsive switch device 90 to move the switch element 91 into bridging relation with contact elements 92, the commutator device 30 operated by the associated wheel of the vehicle is rendered effective to cause a pulsating direct current to flow through the resistor 50 at a frequency determined by the speed at which the vehicle is traveling. The commutator device 30 is in effect operated as a rotary switch for alternately charging and discharging the condensers 48 and 49 in succession, the discharge current being directed through the resistor 50. Assuming that the commutator device is at one instant positioned as shown in Fig. 1, it will be seen that condenser 49 is charged through a circuit which includes the positive terminal of the battery 54, conductor 94, switch contact elements 91 and 92, conductor 93, brush 41, slip ring 38, brush 45, the condenser 49, and conductor 97 leading to the negative terminal of the battery. At the same time the condenser 48, which has previously been charged, is discharged by way of a circuit which includes the upper terminal of the condenser, brush 44, slip ring 39 of the commutator device, brush 42, conductor 99, and resistor 50, the lower terminal of which is connected by way of conductor 97 to the lower terminal of the condenser 48. When the commutator device 30 is further rotated to bring one of the slip ring segments 39a into engagement with the brush 45 while one of the segments 38a is brought into contact with brush 44, the condenser 48 is then charged while the condenser 49 is discharged, through the respective circuits just traced.

The voltage drop produced across the discharge resistor 50 corresponds substantially to the rotational speed of the commutator device 30 and the associated wheel 31 (see Fig. 3). This is so because the direct-current resulting from the condenser discharges is substantially proportional to the frequency of the discharges, which is in turn proportional to the rotational speed of the commutator device.

As already pointed out, the condenser 51 is connected across the resistor 50 in such a manner as to receive a charge corresponding to the voltage drop across the resistor 50 as long as the commutator is driven at a relatively constant speed. When the rotational speed of the associated wheel increases, the current supplied to charge the condenser 51 flows through resistor 100 in such a direction as to aid the negative biasing potential normally impressed on the grid or control member 65 of the electron discharge device 60. When the rotational speed of the wheel and commutator device decreases, the condenser 51 is rendered effective to discharge current through the resistor 100 in the reverse direction, the direction of current flow being in this case such as to establish a potential opposing the negative bias on the grid 65. It will be understood that the degree of current discharged by the resistor 51 during deceleration of the vehicle is substantially proportional to the rate decrease in the voltage drop across the resistor 50, and consequently substantially proportional to the rate of deceleration of the associated wheel.

In actual practice, the elements of the grid biasing circuit for the electron discharge device 60 are so proportioned and arranged with relation to the condenser discharge circuit controlled by the commutator device 30 as to cause the electron discharge device to remain nonconductive while the current is discharged by the condenser 51 during deceleration of the commutator device 30, so long as such discharge current does not exceed a value corresponding to a predetermined critical rate of deceleration of the associated vehicle wheel. This critical rate of deceleration of the wheel, which when exceeded will result in the creation of a sufficient positive voltage on the control member or grid 65 to render the electron discharge device 60 conductive, is preferably in the neighborhood of ten miles per hour per second, a rate of deceleration which occurs only when a wheel is in a slipping condition.

If such an excessive rate of retardation of the vehicle wheel should occur, the condenser 51 discharges a current sufficient to overcome the negative bias on the control member 65, thus rendering the electron discharge device 60 conductive. The magnet 27 of the electro-responsive control device 16 is then energized through a circuit which includes the positive terminal of the battery 55, conductor 75, switch contact elements 71 and 72, conductor 70, the coil of the magnet, conductor 68, the anode-cathode circuit of the electron discharge device 60, and conductor 62 leading to the negative terminal of the battery. Upon energization of the magnet 27, the valve element 22 of the valve device 16 is moved to its lower seated position, thus closing off communication between the control pipe 11 and the brake cylinder 15, while venting the latter to the atmosphere by way of pipe 18, valve chamber 17, and atmospheric discharge port 25. A quick release of the brakes acting on the associated wheel 31, shown in Fig. 3, is thus effected in time to prevent further deceleration of the wheel into a locked state.

Since as already stated the electron discharge device 60 is of the type having an ionizing medium such as gas, the control member or grid 65 can no longer serve to control the plate current after the device has become conductive as just explained. Consequently, it is desirable to provide means for again rendering the electron discharge device nonconductive when the slipping condition of the wheel 31 has been corrected, by terminating the flow of current through the anode-cathode circuit thereby deenergizing the magnet 27 of the control valve device 16, and thus permitting reapplication of the brakes. For this purpose I have provided the fluid pressure responsive switch device 73, which is adapted to retract the contact element 72 to a circuit opening position upon a predetermined reduction in the pressure of fluid in the brake cylinder 15. When the switch device 73 is thus operated to effect deenergization of the magnet 27, the valve element 22 is again moved to its upper seated position, as shown in Fig. 1. Fluid at the pressure of that maintained in the control pipe 11 is thus again supplied to the brake cylinder 15 for initiating a reapplication of the brakes. At the same time, further supply of current through the anode-cathode circuit of the electron discharge device 60 is cut off, and the control member 65 can then reassume control of the circuit, which is meanwhile again completed at the switch contact elements 71 and 72 by response of the switch device 73 to the increased brake cylinder pressure.

Assuming that the associated vehicle wheel has meanwhile been caused to pick up speed until it is again rotating at vehicle speed, by reason of the quick release of the brakes just effected, and that further deceleration of the wheel is continued at a normal, or non-slipping rate, it will be apparent that the current discharged by the condenser 51 will be less than the critical value required to overcome the negative biasing potential on the control member 65 of electron discharge device 60. So long as this condition prevails, the electron discharge device 60 will remain nonconductive, and the brakes will remain under control of the brake valve device 12 alone.

Although the electronic brake control apparatus illustrated in Fig. 1 has been described in connection with a fluid pressure brake equipment associated with one wheel unit of the vehicle, it will be understood that the same apparatus may readily be adapted to effect simultaneous control of all wheel units of each of the trucks of the vehicle, by making the necessary modifications and extensions of the circuits disclosed.

*Apparatus shown in Fig. 2*

In Fig. 2 of the drawings there is illustrated an elementary form of fluid pressure brake system operable for controlling a pair of wheel units of a vehicle truck, in association with an electronic anti-wheel-slide control apparatus embodying the invention in a slightly different form.

Most of the elements of the apparatus shown in Fig. 2 correspond to those of the apparatus already described in connection with Fig. 1, and are accordingly identified by like reference characters. The additional apparatus adapted for association with the second wheel unit for which the system shown in Fig. 2 is adapted comprises similar elements, all of which are identified by corresponding reference characters each having an accent prime. Thus in Fig. 2 there is shown a commutator device 30' which is adapted to be driven by an associated wheel unit controlled by brakes actuated by a brake cylinder 15', this construction being the same as that of the commutator device 30 which as already explained is operated by a wheel unit subject to a braking force applied through the medium of the brake cylinder 15. It will be understood that the commutator device 30' is operative to effect alternate charging and discharging of a pair of condensers 49' and 48', which are operative to discharge a pulsating current through a resistor 50' for establishing a voltage drop that is proportional to the speed of the wheel driving the commutator device 30'. A condenser 51' and adjustable resistor 100' are connected in series across the resistor 50', this condenser being thus arranged to discharge current measuring the rate of deceleration of the wheel unit assiciated with the commutator device 30', during an application of the brakes.

As shown in Fig. 2, the electro-responsive control valve device 16 is adapted to be operated to vent fluid under pressure from both of the brake cylinders 15 and 15' in response to development of a slipping condition by either or both of the wheel units of the truck, as determined by functioning of the respective commutator devices 30 and 30' and the elements related thereto, including an electronic control unit common to both systems.

The electronic control means according to this embodiment of the invention comprises an electron discharge device 160, which in this instance may be a double triode tube of the high vacuum type having a pair of anodes 163 and 163', both of which are connected to the conductor 68 leading to the magnet portion 27 of the control valve device 16, and a pair of cathodes 161 and 161', which are associated with the anodes 163 and 163', respectively. The cathodes may be indirectly heated by means of a filament circuit 166 energized from a suitable source of power, not shown. For controlling flow of current between the cathode 161 and anode 163 there is provided a control member or grid 165, which is adapted normally to receive a negative biasing potential impressed thereon by means of the battery 80 and voltage divider 81, as hereinbefore explained in connection with the control member 65 of the electron discharge device 60 shown in Fig. 1. Another control member or grid 165' is associated with the cathode 161' and anode 163'. A battery 80' and voltage divider 81' are arranged to impress a negative voltage through the medium of a current limiting resistor 83' on the control member 165'.

Since the principle of operation of the apparatus shown in Fig. 2 is much the same as that already explained in connection with the system shown in Fig. 1, it will now be understood that the electron discharge device 160 is arranged to control operation of the control valve device 16 associated with brake cylinders 15 and 15' in response to detection of a wheel slipping condition by either of the commutator devices 30 or 30'. If an application of the brakes is effected, and the switch device 90 is operated to its circuit closing position, the commutator devices 30 and 30' are rendered operative to effect alternate charging and discharging of the respective sets of condensers in the manner hereinbefore explained.

If the wheel unit associated with commutator device 30 should decelerate at an excessive rate indicating a slipping condition, the resultant discharge of electrical energy from the condenser 51 through resistor 100, in a direction such as to cause a positive voltage to be impressed on the control member 165, will render the electron discharge device 160 conductive. The electromagnet portion of the brake control device 16 is thereby energized through the circuit which includes the positive terminal of the battery 55, conductor 75, the magnet portion 27, the conductor 68, the plate or anode 163, cathode 161, and conductor 62 leading to the negative terminal of the battery. The valve device 16 is thus operated to vent fluid under pressure from the brake cylinders 15 and 15' for effecting a quick release of the brakes.

If on the other hand the wheel driving the commutator device 30' begins to decelerate at a slipping rate, the local discharge of current from the condenser 51' is effected at such a rate as to overcome the normal negative bias on the control member 165' of the electron discharge device 160. The latter device is thus rendered conductive for causing energization of the magnet of the control valve device 16 through the circuit just described, which this time includes the anode 163' and cathode 161' of the electron discharge device.

Since the electron discharge device 160 is of the non-ionizing or high vacuum type, the control members 165 and 165' are at all times effective to check the flow of current through the respective anode-cathode circuits of the device upon withdrawal of the condenser discharge voltage permitting restoration of the normal negative biasing voltage supplied by batteries 80 and 80', without requirement of termination of the flow of current by an external means such as the brake cylinder pressure switch 73 shown in Fig. 1. With this switch eliminated from the equipment, the total cost thereof is of course reduced, and in addition the braking performance may be somewhat improved, due to the fact that the control valve device 16 will be operated to vent fluid under pressure from the brake cylinders only to the extent required for correction of the wheel slipping condition at any given time. Thus when a slipping wheel has been caused to accelerate back to the speed of the vehicle as a result of a partial release of brake cylinder pressure, the consequent fading of discharge current from the active condenser 51 or 51' permits the associated control member of the electron discharge device to resume a negative bias. The electron discharge device then becomes nonconductive and deenergizes the control valve device to prevent further reduction in brake cylinder pressure.

To summarize, an equipment constructed in accordance with my invention may comprise a rotary member to be controlled, such as a vehicle wheel, controlling means such as a brake for governing operation of the rotary member or wheel, and electronic means constructed and arranged to respond to a critical rotative characteristic of the rotary member for so governing the operation of the controlling means as to maintain operation of the rotary member within a definite range of conditions. In the foregoing description of practical applications of the invention involving the control of the brakes on a railway vehicle, there has been disclosed an electro-pneumatic brake system in which are combined fluid pressure brake means operable in response to manipulation of a brake valve for controlling application and release of the brakes associated with a wheel, electrical means for accurately measuring the rate of deceleration of the wheel produced during an application of the brakes, and electronic brake controlling means cooperative with the electrical means and with the fluid pressure brake means for affording precise and smooth automatic control of the brakes to an extent not heretofore obtainable in high speed railway service. It is contemplated that within the scope of the present invention, the electronic brake controlling apparatus disclosed may be adapted for adjustment to various special operating conditions which may be encountered in railway service, and may be readily designed for association with other types of brake equipment than the class described.

Having now described my invention, what I claim as new and desire to secure by Letters Patent is:

1. In a vehicle wheel brake system having electro-responsive brake controlling means operable, after an application of the brakes has been effected, to reduce the degree of application of the brakes, in combination, electrical control apparatus constructed and arranged to establish an electrical characteristic that is a measure of a rotative condition of the vehicle wheel, a source of electrical energy, an electric discharge device having a control member subject to a potential determined by said electrical characteristic, and an anode-cathode circuit connected to said source and to said brake controlling means, and means for impressing a biasing voltage on said control member for rendering said electric discharge device normally nonconductive, said electric discharge device being rendered conductive by alteration of the resultant voltage on said control member in response to a predetermined change in said electrical characteristic.

2. In a vehicle wheel brake system having electro-responsive brake controlling means operable, after an application of the brakes has been effected, to reduce the degree of application of the brakes, in combination, electrical control apparatus constructed and arranged to establish an electrical characteristic that is a measure of a rotative condition of the vehicle wheel, a supply circuit, electron discharge means controlling the flow of current through said supply circuit to said brake controlling means, said electron discharge means being subject to a biasing voltage normally preventing energization of said brake controlling means, and circuit means serving to subject said electron discharge means to a control voltage opposing said biasing voltage for effecting operation thereof to supply current to said brake controlling means, in response to the electrical characteristic established by said electrical control apparatus.

3. In a vehicle brake system having a control device operative, while the brakes are applied, to reduce the degree of application of the brakes associated with a wheel of the vehicle, in combination, electrical apparatus operative to detect the rate of rotational deceleration of the wheels including a control circuit on which is impressed a potential substantially proportional to the rate of deceleration, electrical means for effecting operation of said control device, means for controlling the energization of said electrical means and comprising a source of electrical energy and an electric discharge device having an anode, a cathode, and a control member, means for impressing a bias potential on said control member to render said discharge device normally nonconductive, and means associated with said control circuit for impressing a resultant voltage on said control member rendering said discharge device effective in response to deceleration of the wheel at a predetermined rate.

4. In a brake equipment for a vehicle including a brake cylinder constructed and arranged to be supplied with fluid under pressure for effecting an application of the brakes to a wheel of the vehicle, and an electro-responsive control valve device automatically operable to vent fluid under pressure from said brake cylinder to effect quick release of the brakes, the combination of a supply circuit for controlling energization of said control valve device, means for controlling said circuit comprising an electric discharge device having an anode, a cathode and a control member, means for impressing a negative bias potential on said control member for rendering said electric discharge device normally nonconductive, and means responsive to a predetermined rotative condition of the wheel for causing the potential on said control member to become positive, thereby rendering said electric discharge device conductive for effecting energization of said electro-responsive control valve device.

5. In a brake equipment for a vehicle including a brake cylinder constructed and arranged to be supplied with fluid under pressure for effecting an application of the brakes to a wheel of the vehicle, and an electro-responsive control valve device automatically operable to vent fluid under pressure from said brake cylinder to effect quick release of the brakes, the combination of a supply circuit for controlling energization of said control valve device, means for controlling said circuit comprising an electric discharge device having an anode, a cathode and a control member, means for impressing a negative bias potential on said control member for rendering said electric discharge device normally nonconductive, and electrical means including a capacitance circuit operative in response to deceleration of the wheel at a predetermined rate for impressing a preponderant positive voltage on said control member, thereby rendering said electric discharge device conductive to effect energization of said electro-responsive control valve device.

6. In a brake equipment for a vehicle including a brake cylinder constructed and arranged to be supplied with fluid under pressure for effecting an application of the brakes to a wheel of the vehicle, and an electro-responsive control valve device automatically operable to vent fluid under pressure from said brake cylinder to effect quick release of the brakes, the combination of a supply circuit for controlling energization of said control valve device, means for controlling said circuit comprising an electric discharge device having an anode, a cathode and a control member, means for impressing a negative bias potential on said control member for rendering said electric discharge device normally nonconductive, electrical means constructed and arranged for operation while the brakes are applied to impress on said control member a positive voltage that is an indication of a rotative condition of the vehicle wheel, and means for rendering said electrical means inoperative so long as the brakes are released.

7. In a brake equipment for a vehicle including a brake cylinder constructed and arranged to be supplied with fluid under pressure for effecting an application of the brakes to a wheel of the vehicle, and an electro-responsive control valve device automatically operable to vent fluid under pressure from said brake cylinder to effect quick release of the brakes, the combination of a supply circuit for controlling energization of said control valve device, means for controlling said circuit comprising an electric discharge device having an anode, a cathode and a control member, means for impressing a negative bias potential on said control member for rendering said electric discharge device normally nonconductive, electrical means constructed and arranged for operation while the brakes are applied to impress on said control member a positive voltage that is an indication of a rotative condition of the vehicle wheel, and fluid pressure operated switch means normally rendering said electrical means inoperative and constructed and arranged to respond to the pressure of fluid supplied in effecting an application of the brakes for rendering said electrical means operative.

8. In a brake equipment for a vehicle including a brake cylinder constructed and arranged to be supplied with fluid under pressure for effecting an application of the brakes to a wheel of the vehicle, and an electro-responsive control valve device automatically operable to vent fluid under pressure from said brake cylinder to effect quick release of the brakes, the combination of a supply circuit for controlling energization of said control valve device, means for controlling said circuit comprising an electric discharge device having an anode, a cathode and a control member, means for impressing a negative bias potential on said control member for rendering said electric discharge device normally nonconductive, electrical means including a condenser constructed and arranged to be charged to a potential varying according to the operation of said vehicle wheel, and a discharge circuit including a resistor connected to said control member and adapted to receive current discharged from said condenser at a rate measuring the deceleration of the wheel, the discharge current from said condenser being directed through said resistor in such a direction as to impress a positive voltage on said control member, whereby said electric discharge device is rendered conductive in response to deceleration of the wheel at a rate exceeding a predetermined rate.

9. In a vehicle brake system having an electro-responsive control device operative, while the brakes are applied, to reduce the degree of application of the brakes on at least one wheel of the vehicle, in combination, electron discharge means constructed and arranged for operation to control energization of said electro-responsive control device, said electron discharge device being normally maintained in nonconductive condition, a first condenser effective to render said electron discharge device conductive, a second condenser, and means associated with a wheel of the vehicle for causing alternate charging and discharging of said second condenser, discharging of said second condenser being effective to cause charging of said first condenser, said means relating said electron discharge device and said first condenser in a manner such that when said wheel slips said first condenser renders said device conductive.

10. In an electro-pneumatic brake equipment for a vehicle including a brake cylinder, means operative to control the pressure of fluid in said brake cylinder for applying and releasing the brakes on at least one wheel unit of the vehicle, and an electro-responsive control valve device independently operative to release fluid from said brake cylinder, the combination of a source of direct current, an electron discharge device comprising an envelope containing an ionizing medium, a control member, and an anode-cathode circuit in series with said source and said electro-responsive control valve device, means for normally impressing a bias voltage upon said control member rendering said electron discharge device nonconductive, electrical means operative in response to deceleration of said wheel unit at an excessive rate for impressing an opposing voltage on said control member rendering said electron discharge device conductive, and means responsive to a predetermined reduction in brake cylinder pressure for breaking the circuit through said electron discharge device, whereby said control member can regain control of said circuit subject to further operation of said electrical means.

11. In an electro-pneumatic brake equipment for a vehicle including a brake cylinder, means operative to control the pressure of fluid in said brake cylinder for applying and releasing the brakes on at least one wheel unit of the vehicle, and an electro-responsive control valve device independently operative to release fluid from said brake cylinder, the combination of a source of direct current, an electron discharge device comprising an envelope containing an ionizing medium, a control member, and an anode-cathode circuit in series with said source and said electro-responsive control valve device, means for normally impressing a bias voltage upon said control member rendering said electron discharge device nonconductive, electrical means operative in response to deceleration of said wheel unit at an excessive rate for impressing an opposing voltage on said control member rendering said electron discharge device conductive, a capacitance circuit connected in parallel relation with said electro-responsive control valve device, and a fluid pressure operated switch responsive to a predetermined reduction in brake cylinder pressure for breaking the circuit through said electron discharge device, whereby said control member can regain control of said circuit subject to further operation of said electrical means.

12. In a brake system for a wheeled vehicle having electro-responsive brake control means operable, after an application of the brakes has been initiated, to reduce the degree of application of the brakes, in combination, a plurality of electrical devices each constructed and arranged to establish an electrical characteristic that is a measure of the rate of deceleration of one of the wheels of said vehicle, and an electron discharge device having a plurality of anode-cathode circuits each connected to control energization of said electro-responsive brake control means, and a plurality of control elements therefor responsive respectively to said electrical devices, said electron discharge device being adapted to be rendered effective to cause operation of said brake control means in response to a predetermined value of the electrical characteristic impressed on either one of said control elements.

13. In a brake control system for a vehicle having a wheel, in combination, electro-responsive brake controlling means operative to reduce the degree of an application of the brakes for correcting a slipping condition of said wheel, generator means operative by rotation of said wheel, a condenser adapted to be charged by said generator means during acceleration of the wheel and to be discharged upon deceleration thereof, and electron discharge means constructed and arranged to respond to a predetermined value of current discharged by said condenser, indicating a wheel-slip condition, for effecting energization of said electro-responsive brake controlling means.

14. In a brake control system for a vehicle having a wheel, in combination, electro-responsive brake controlling means operative to reduce the degree of an application of the brakes for correcting a slipping condition of said wheel, generator means operative by rotation of said wheel, a condenser adapted to be charged by said generator means during acceleration of the wheel and to be discharged upon deceleration thereof, a resistor connected in the discharge circuit of said condenser and adapted to take a voltage that is a measure of the rate of deceleration of said wheel, an electron discharge device having an anode-cathode circuit connected to said electro-responsive brake controlling means and a control member connected to said resistor, and a source of electrical energy for impressing a negative biasing voltage on said control member rendering said electron discharge device normally non-conductive, said source being also connected to energize said anode-cathode circuit when said device becomes conductive.

15. In a brake system for a vehicle having a plurality of wheel units and fluid pressure brake means for each of said wheel units, the combination of an electro-responsive brake control device operative to reduce the degree of an application of the brakes on said wheel units, a source of electrical energy, a plurality of electron discharge devices associated with said wheel units, respectively, each discharge device comprising a control member and an anode-cathode circuit connecting said source with said brake control device, means for impressing a negative biasing voltage on all of said control members for rendering said discharge devices normally non-conductive, and a plurality of control circuits including energizing means responsive to rotation of said wheel units, respectively, each of said control circuits being connected to impress a resultant positive voltage on the control member of the corresponding discharge device for rendering same conductive upon deceleration of the related wheel unit at a slipping rate.

16. In a brake system for a vehicle having a plurality of wheel units and fluid pressure brake means for each of said wheel units, the combination of an electro-responsive brake control device operative to reduce the degree of an application of the brakes on said wheel units, a plurality of generator devices operative by rotation of said wheel units, respectively, a plurality of electron discharge devices, each associated with one of said generator devices and comprising a control member and an anode-cathode circuit individually connected for controlling energization of said brake control device, means for impressing a negative biasing voltage on all of said control members for rendering said discharge devices normally non-conductive, and a plurality of control circuits each including a condenser and a resistor energized by one of said generator devices in accordance with the rotative condition of the corresponding wheel unit, whereby upon deceleration of any wheel unit at a rate exceeding a predetermined rate a resultant positive voltage is impressed on the control member of the corresponding discharge device for rendering same conductive.

17. In a brake control system for a vehicle having a wheel on which the brakes may be applied and released under the control of the operator, in combination, electro-responsive brake control means operative to reduce the degree of an application of the brakes active on the wheel, direct-current generator means for supplying a direct current voltage substantially proportional to the rotational speed of the wheel, an electrical condenser, means operative upon initiation of a brake application under the control of the operator for causing said condenser to be charged by voltage supplied from said generator means, an electron discharge device having a control element normally biased to render the discharge device non-conductive, means providing a circuit including a resistor through which said condenser is discharged upon deceleration of the wheel to provide a voltage on said resistor substantially proportional to the rate of deceleration of the wheel, and means connecting said resistor to the control element of said discharge device for impressing a potential thereon in opposition to the normal biasing potential to render said discharge device conductive, said discharge device being effective, when conductive, to cause operation of said electroresponsive brake controlling means.

18. In a brake control equipment for a vehicle having a wheel unit on which the brakes may be applied and released under the control of the operator, in combination, an electron discharge device having a control element normally subject to a biasing potential rendering the discharge device non-conductive, a biasing resistor connected to said control element, means for creating a potential on said biasing resistor corresponding substantially to the rate of deceleration of the wheel unit and capable of rendering said discharge device conductive only while the wheel unit decelerates at a rate exceeding a certain rate, and electro-responsive brake control means operative to effect a reduction in the degree of application of the brakes active on the wheel unit only while said discharge device is conductive.

CLAUDE M. HINES.